US007818597B2

(12) United States Patent
Kangas et al.

(10) Patent No.: US 7,818,597 B2
(45) Date of Patent: Oct. 19, 2010

(54) COMPUTER SYSTEM FAULT DETECTION

(75) Inventors: Paul D. Kangas, Raleigh, NC (US); David J. Steiner, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 823 days.

(21) Appl. No.: 11/690,973

(22) Filed: Mar. 26, 2007

(65) Prior Publication Data
US 2008/0244296 A1 Oct. 2, 2008

(51) Int. Cl.
H02J 9/04 (2006.01)
G06F 1/30 (2006.01)
(52) U.S. Cl. ............... 713/323; 713/340; 307/64
(58) Field of Classification Search ........... 713/322, 713/323, 340; 307/64
See application file for complete search history.

(56) References Cited

U.S. PATENT DOCUMENTS 4,730,121 A * 3/1988 Lee et al. ............ 307/66

(Continued)

FOREIGN PATENT DOCUMENTS

JP 03219319 A * 9/1991

(Continued)

OTHER PUBLICATIONS

Publication No. JP04015718A; Jan. 21, 1991; Patent Abstract of Japan; Inventor Hiroaki (1 page).

(Continued)

*Primary Examiner*—Thomas Lee
*Assistant Examiner*—Zahid Choudhury
(74) *Attorney, Agent, or Firm*—Cantor Colburn LLP; Jason Piche

(57) ABSTRACT

A computer system is disclosed. The computer system includes a core processor, a power supply including a first output in power communication with the core processor, and a power switch in signal communication with the power supply for controlling a state of the first output. The computer system also includes a service processor in signal communication with the sub-system and power communication with a second output of the power supply and a back up power supply. In response to activation of the power switch and a fault of the second output, the service processor uses the back up power supply and a reduced power mode to detect the fault of the second output and generate a signal representative thereof to be displayed upon a light emitting diode display.

6 Claims, 3 Drawing Sheets

U.S. PATENT DOCUMENTS

| | | | |
|---|---|---|---|
| 5,553,231 A * | 9/1996 | Papenberg et al. | 714/5 |
| 5,801,457 A * | 9/1998 | Hong et al. | 307/80 |
| 5,834,859 A * | 11/1998 | Eitan et al. | 307/66 |
| 6,118,188 A * | 9/2000 | Youssef | 307/43 |
| 6,181,029 B1 | 1/2001 | Berglund et al. | |
| 6,195,754 B1 * | 2/2001 | Jardine et al. | 713/324 |
| 6,205,414 B1 * | 3/2001 | Forsman et al. | 703/26 |
| 6,345,369 B1 * | 2/2002 | Kitamorn et al. | 714/14 |
| 6,535,944 B1 | 3/2003 | Johari et al. | |
| 6,850,396 B1 | 2/2005 | Clemo et al. | |
| 7,010,726 B2 * | 3/2006 | Faust et al. | 714/45 |
| 7,337,357 B2 * | 2/2008 | Cagno et al. | 714/14 |
| 7,346,792 B2 * | 3/2008 | Anderson et al. | 713/323 |
| 7,526,674 B2 * | 4/2009 | Bailey et al. | 714/14 |
| 2001/0008021 A1 * | 7/2001 | Ote et al. | 714/31 |
| 2002/0091869 A1 * | 7/2002 | Jones et al. | 709/310 |
| 2002/0124209 A1 * | 9/2002 | Faust et al. | 714/37 |
| 2005/0010738 A1 * | 1/2005 | Stockdale et al. | 711/170 |
| 2005/0223211 A1 * | 10/2005 | Sukegawa et al. | 713/2 |
| 2007/0162625 A1 * | 7/2007 | Saulsbury et al. | 710/8 |
| 2008/0201710 A1 * | 8/2008 | Anderson et al. | 718/1 |
| 2008/0212273 A1 * | 9/2008 | Bechtolsheim | 361/685 |
| 2009/0063901 A1 * | 3/2009 | Suzuki et al. | 714/25 |

FOREIGN PATENT DOCUMENTS

WO     00/58846 A1    10/2000

OTHER PUBLICATIONS

Publication No. JP63205717A; Aug. 25, 1988; Patent Abstract of Japan; Inventor Kazuo, et al (1 page).

Publication No. JP62038945A; Feb. 19, 1987; Patent Abstract of Japan; Inventor Chikashi (1 page).

Hochdoerfer, et al. "Processor Power Control and Monitoring System"; TDB; Dec. 1988; p. 198-201.

* cited by examiner

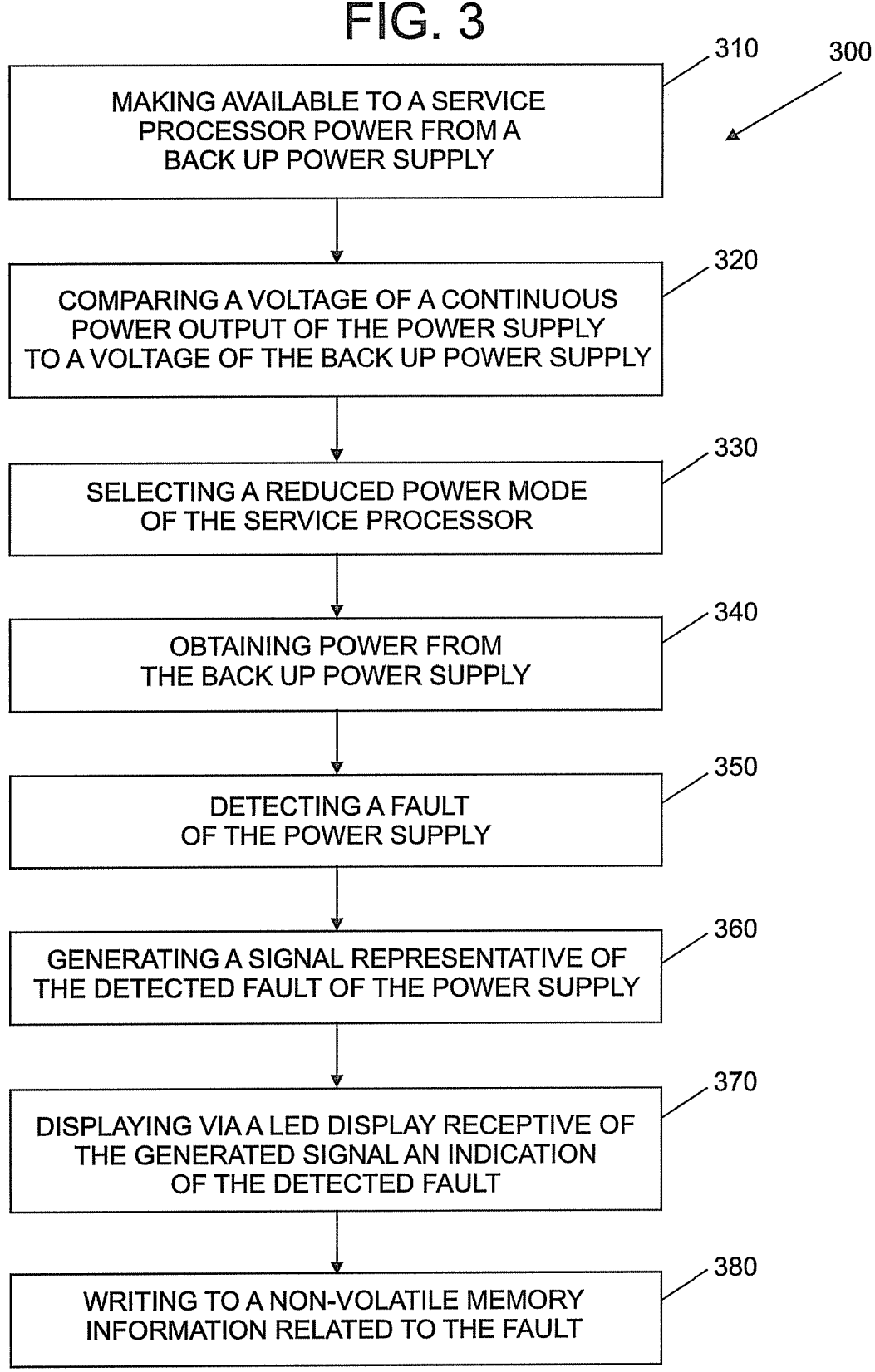

US 7,818,597 B2

COMPUTER SYSTEM FAULT DETECTION

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to computer system diagnostics, and particularly to service processor circuits.

2. Description of Background

Before our invention computer systems, such as servers, have included a stand-alone microprocessor circuit, also known as a service processor that is used to detect operational faults of sub-systems of the computer system, such as a memory fault, or a hard disk drive fault, for example. The service processor can respond to a detected fault by at least one of writing information into a non-volatile flash memory event log for subsequent interrogation by a service technician, and illuminating light emitting diodes (LEDs) that indicate a sub-system fault that may prevent operation of the computer system as expected.

The service processor is typically powered from an 'always on' standby direct current (DC) output from a main power supply, allowing the service processor to detect sub-system faults during a boot-up sequence of the computer system. The service processor will not function to diagnose faults of the main power supply if the 'always on' output is, in fact, not on. Accordingly, there is a need in the art for a service processor circuit arrangement that overcomes these drawbacks.

SUMMARY OF THE INVENTION

The shortcomings of the prior art are overcome and additional advantages are provided through the provision of a secondary low power source to temporarily power a portion of the service processor for detection of possible the main power supply faults.

An embodiment of the invention includes a computer system. The computer system includes a core processor, a sub-system in signal communication with the core processor, a power supply including a first output in power communication with the core processor and a power switch in signal communication with the power supply for controlling a state of the first output. The system also includes a service processor in signal communication with the sub-system and the power supply, the service processor responsive to an unexpected operating condition for detecting a fault of at least one of the sub-system and the power supply and generating a signal representative of the fault. The service processor is in power communication with a second output of the power supply and a back up power supply. In response to activation of the power switch and a fault of the second output, the service processor uses the back up power supply and a reduced power mode to detect the fault of the second output and generate a signal representative thereof. The signal is displayed via a light emitting diode display in signal communication with the service processor, and is stored within a non-volatile memory in signal communication with the service processor.

Another embodiment of the invention includes a method of detecting a fault of a power supply for a computer system. The method includes making available to a service processor power from a back up power supply in response to activation of a power switch and comparing a voltage of a continuous power output of the power supply to a voltage of the back up power supply. In response to the voltage of the back up power supply being greater than the voltage of the continuous power output, the method includes selecting a reduced power mode of the service processor, obtaining power from the back up power supply, detecting a fault of the power supply, and generating a signal representative of the detected fault of the power supply. The method further includes displaying via a LED display receptive of the generated signal an indication of the detected fault and writing to a non-volatile memory information related to the fault.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which will generate an output to inform a user of a status of the main power supply in the event of a suspected fault of the main power supply.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 3 illustrates one example of a flow chart of process steps of a method for detecting faults of a power supply.

The detailed description explains the preferred embodiments of the invention, together with advantages and features, by way of example with reference to the drawings.

DETAILED DESCRIPTION OF THE INVENTION

An embodiment of the invention will provide a secondary low power source, such as a coin cell battery, as is often used with complementary metal-oxide-semiconductor (CMOS) memory circuits, or a capacitor to provide back up power to the service processor. In an embodiment, in response to a power switch of the the computer system being depressed, a status of the power supply, as detected by the service processor, will be displayed to the user via one or more LEDs.

Figure 1:
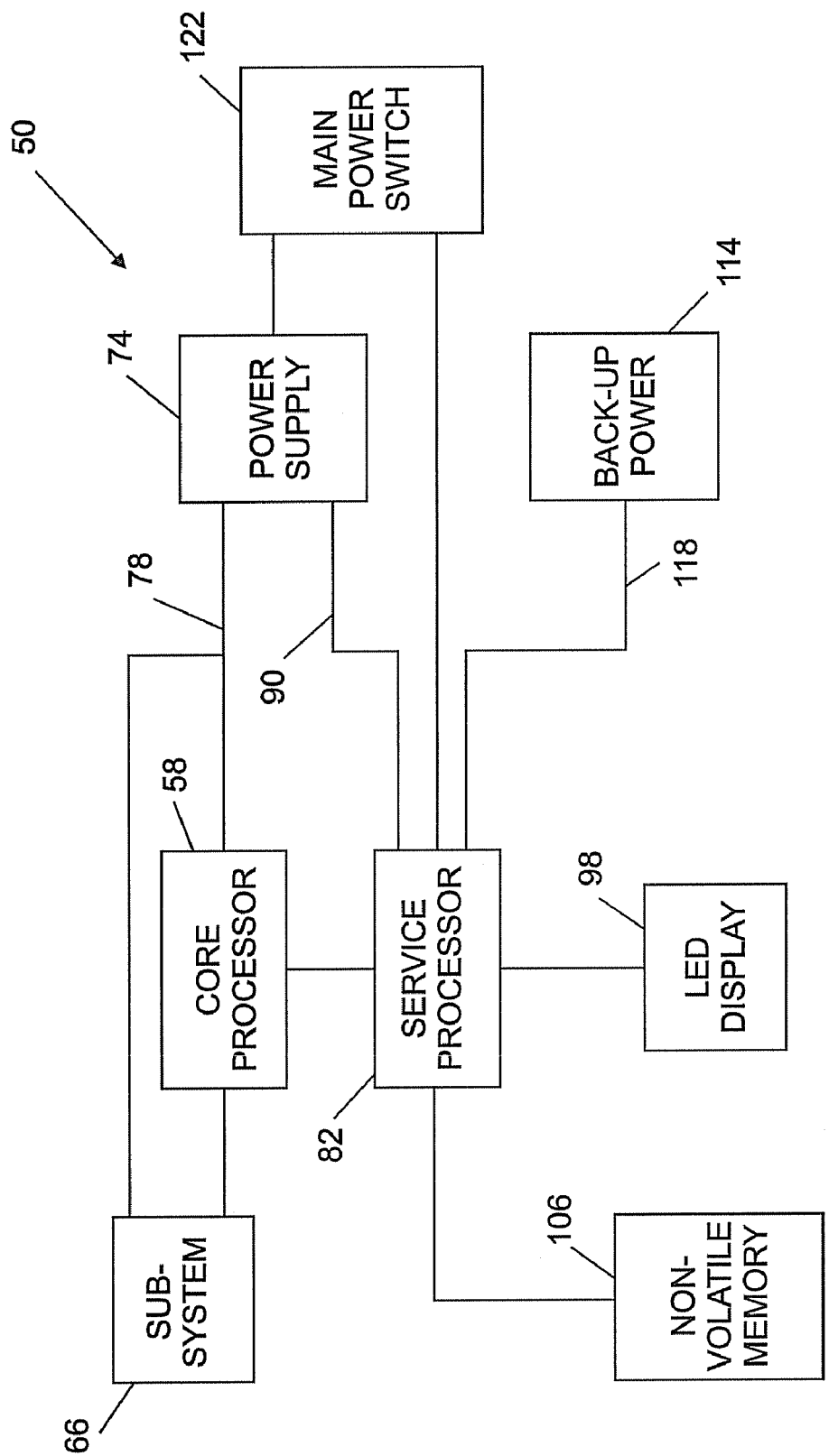
FIG. 1 illustrates one example of a schematic block diagram of a computer system.

Referring now to FIG. 1, a high-level block schematic diagram of a computer system 50 is depicted. The computer system 50 includes a core processor 58, such as a central processing unit (CPU), for example. The computer system 50 includes at least one sub-system 66 in signal communication with the core processor 58 for performing various functions of the computer system 50. Examples of sub-systems 66 include memory, storage devices, and interface devices. A power supply 74 provides power to the core processor 58 and the sub-systems 66. The core processor 58 is in power connection with the power supply 74 via a main output 78 (also herein referred to as a first output).

A service processor 82 is in signal communication with the sub-systems 66 via the core processor 58. The service processor 82 is responsive to unexpected operating conditions of the sub-systems 66 and the power supply 74 to detect operational faults of the sub-systems 66 as well as the power supply 74. As used herein, the term "fault" with reference to operation of at least one of the sub-system 66 and the power supply 74 will indicate an operating characteristic that is not within an acceptable range of normal operating characteristics that are established to provide expected results. In response to detecting the fault, the service processor 82 generates a signal representative of the operational fault.

The service processor 82 is in power connection with the power supply 74 via an 'always on' continuous output 90 (also herein referred to as a second output). The continuous output 90 allows the service processor 82 to detect faults of sub-systems 66 that may occur only during boot-up of the computer system 50, as well as faults of the power supply 74 itself. Additionally, the continuous output 90 may be used to power components (not shown) of the computer system 50 such as a time of day clock, configuration memory, and local area network circuit, for example.

Information, such as identification of sub-systems 66 that may include faults for example, is provided via display upon an LED display 98 that is responsive to the signal generated by the service processor 82. Additionally, information regarding an operation status of sub-systems 66, such as information relating to a detected fault for example, is stored within a system event log in a non-volatile memory 106, such as an electronically erasable programmable read-only memory (EEPROM), for subsequent interrogation and retrieval, for example. Non-volatile memory 106 is capable of retaining information in the absence of power.

In the event of a fault of the continuous output 90 of the power supply 74, a back up power supply 114, such as a coin cell battery or a capacitor, for example, provides power via a back up output 118 to the service processor 82. A power switch 122 is in signal communication with the power supply 74, and is capable of controlling a state, such as on or off for example, of the main output 78. The power switch 122 is also in signal communication with the service processor 82 to facilitate detection of faults of the power supply 74, as will be described further below. Examples of faults of the power supply 74 may include one or more of a lack of input power to the power supply 74, a lack of output power to the continuous output 90, a continuous output 90 voltage that is outside of a defined tolerance, a lack of output power to the main output 78, and a main output 78 voltage that is outside of a defined tolerance.

Figure 2:
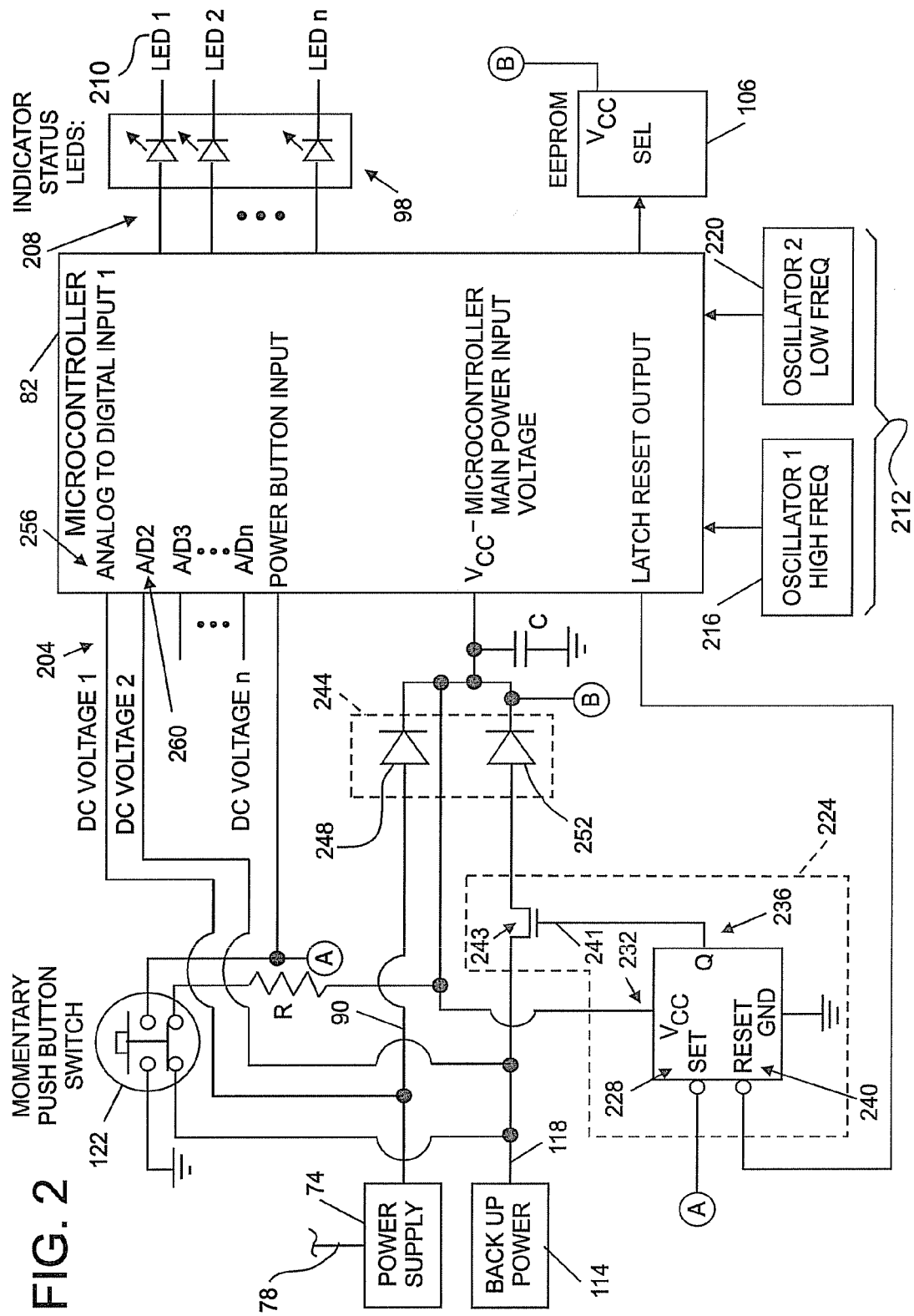
FIG. 2 illustrates one example of a schematic block diagram of components related to operation of the service processor.

Referring now to FIG. 2, a detailed block schematic of components related to operation of the service processor 82 is depicted. In an embodiment, the service processor 82 is a microcontroller, which includes a CPU and internal memory for storage of instruction codes and data for performing normal processing functions. The microcontroller 82 has a plurality of inputs 204 that provide various sensing functions related to detecting faults of sub-systems 66. The inputs 204 can include analog to digital inputs for measuring DC voltages, for example. The microcontroller 82 has a plurality of outputs 208 for indicating any detected faults, such as causing a LED 210 of the LED display 98 to flash, for example.

A clock source 212 for the microcontroller 82 includes two operational frequencies. A high frequency 216 is used for normal operation of the microcontroller 82, and a low frequency 220 will be used in conjunction with the back up power supply 114, as will be described further below. In an alternative embodiment, the microcontroller 82 may include an internal clock source 212 in conjunction with a function to select the appropriate frequency.

In an embodiment, the power switch 122 is a momentary push button switch, and is used in conjunction with a memory latch 224 to store the state of the momentary push button switch 122. The memory latch 224 is configured to make available to the microcontroller 82 power from the back up power supply 114 via the back up output 118 for a specified duration. A set input 228 of the memory latch 224 is responsive to the power switch 122 to connect a power input 232 with a power output 236. A reset input 240 will disconnect the power input 232 from the power output 236, to reduce power consumption from the back up power supply 114. The reset input 240 is responsive to a determination by the microcontroller 82 that the back up power supply 114 is not required, such as a determination that there is no fault with the power supply 74 or following indication via the LED display 98 of the fault, for example. In an exemplary embodiment, the power output 236 is in connection with a gate terminal 241 of a field effect transistor 243. Accordingly, in response to the set input 228 connecting the power input 232 with the power output 236, a positive gage voltage is provided to the field effect transistor 243, causing it to become conductive and make available to the microcontroller 82 power from the back up output 118. Likewise, in response to the reset input 240 disconnecting the power input 232 from the power output 236, the field effect transistor 243 will become non-conductive, and remove from the microcontroller 82 power from the back up power supply 114. It will be appreciated that the foregoing is for purposes of illustration, and not limitation.

The continuous output 90 and back up output 118 are in power connection with the microcontroller 82 via a diode connection 244 (also herein referred to as a diode circuit) for selecting the back up output 118 to power the microcontroller 82 in response to a fault of the power supply 74. The diode connection 244 includes a first diode 248 in power connection with the continuous output 90 and a second diode 252 in power connection with the back up output 118 via the memory latch 224. Under expected circumstances, the voltage of the continuous output 90 is greater than the back up output 118, such as a continuous output 90 voltage of 5 volts, and a back up output 118 of 3.3 volts, for example. In response the continuous output 90 voltage being greater than the back up output 118 voltage, only the first diode 248 will conduct, because the relatively higher voltage at the output of the two diodes 248, 252 will prevent conduction of the second diode 252. Accordingly, the microcontroller 82 will be powered by the continuous output 90, consuming no power from the back up power supply 114. In response to the continuous output 90 providing a voltage lower than a voltage of the back up output 118, (such as in the event of a fault of the power supply 74), the second diode 252 will conduct, thereby powering the microcontroller 82 via the back up power supply 114. In an embodiment, 3.3 volt coin cell batteries can be connected in series or parallel combination to increase the backup voltage or increase the battery capacity, respectively. Microcontrollers 82 with various levels of low operating voltage can be selected to operate with a particular voltage level of continuous output 90 and backup output 118.

In view of the foregoing, the computer system 50 facilitates a method of detecting faults of the power supply 74. In an embodiment, in response to activation of the power switch 122, the memory latch circuit 224 is set to make available to the microcontroller 82 power via the back-up output 118. In response to the voltage of the continuous output 90 of the power supply 74 being less than the voltage of the back up output 118, thereby indicating the operational fault of the continuous output 90 of the power supply 74, the diode connection 244 provides to the microcontroller 82 power via the back up power supply 114.

In response to the microcontroller 82 sensing at a first input 256 and a second input 260 that the fall voltage of the continuous output 90 is less than the fall voltage of the back up output 118, the microcontroller 82 enters, or uses a "sub-active mode" (also herein referred to as a reduced power mode) for detecting a fault of the continuous output 90 of the power supply 74. The "sub-active mode" includes an alternate firmware boot path (microcontroller 82 instructions) that reduces the functionality of the microcontroller 82 with regard to fault detection of sub-systems 66. Accordingly, in the "sub-active mode", the microcontroller 82 focuses upon detection of faults related to the power supply 74. The "sub-active mode" utilizes the low frequency 220 clock speed to reduce power consumption by the microcontroller 82 of the back up power supply 114.

The voltage of the back up output 118, as detected at the second input 260, can be used to provide further diagnostic information, such as a remaining capacity of the back up power supply 114, for example. In an exemplary embodiment, in response to the microcontroller 82 detecting that the voltage of the back up output 118 is below a specified level, the microcontroller 82 is capable of selecting a second alternate boot path to further reduce power consumption from the back up power supply 114.

In response to the microcontroller 82 detecting a fault of the power supply 74, the microcontroller 82 generates a signal that causes the LED 210 within the LED display 98 to flash for a defined number of cycles. The LED 210 is arranged to indicate that a power supply 74 fault has been detected. The LED display 98 can also be used to indicate a reduced capacity of the back up power supply 114. The defined number of cycles, such as 4 cycles in 5 seconds with low duty cycle, for example, is selected to minimize a power consumption of the back up power supply 114 by the LED display 98. In an embodiment, the system event log, including details of the detected power up fault of the power supply 74, such as one or more of a detected input voltage, a detected output voltage, and a detected missing voltage, for example, is written to the non-volatile memory 106. The system event log is used for additional, subsequent diagnostics, such as remote management diagnostics, to examine details regarding intermittent faults, for example.

It is contemplated that in response to activation of the power switch 122 and use of the back up power supply 114 for operation of the service processor 82 to detect faults, power the LED display 98, and write the system event log to the non-volatile memory 106, about 10 milliamps will be consumed for about 5 seconds. It will be appreciated that an exemplary back up power supply 114, such as a 3.3 volt CR2032 coin cell battery, for example, can have a nominal capacity of 225 milliamp-hours, with a supply of about 200 milliamp-hours to a cell voltage of about 2.0 volts. Assuming a scenario of five power-up faults per day that each require use 5 second duration 10 milliamp current pulses of the CR2032 coin cell 114, the 200 milliamp-hour capacity is calculated to last for 39 years. It will be further appreciated that a practical life expectancy or such a coin cell is about 10 years. Although additional circuit elements such as the nonvolatile memory 106 and flashing LED display 98 may consume an incremental amount of current in addition to the above microcontroller 82 calculation, it will be appreciated that the battery capacity is sufficient for operation within the practical life expectancy.

Referring now to FIG. 3, a flowchart 300 of process steps of a method for detecting faults of a power supply, such as the power supply 74 within the computer system 50, are depicted. The method begins in response to activation of the power switch 122, by making available at Step 310 to the service processor 82 power from the back up power supply 114. The method includes comparing at Step 320, by the service processor 82, the voltage of the continuous output 90 of the power supply 74 to the voltage of the back up power supply 114. In response to the service processor 82 determining that the voltage of the back up power supply 114 is greater than the voltage of the continuous output 90, the method includes testing the power supply 74 by selecting, or using at Step 330 the reduced power mode of the service processor 82 to proceed with testing the power supply 74. The testing of the power supply 74 further includes obtaining at Step 340 power from the back up power supply 114 and detecting at Step 350 the fault of the continuous output 90 of the power supply 74. The testing continues with generating at Step 360 the signal representative of the detected fault of the power supply 74, displaying at Step 370 via the LED display 98 receptive of the generated signal the indication of the detected fault, such as flashing the LED 210 of the LED display 98, and writing at Step 380 to the non-volatile memory 106 information related to the fault.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computer system comprising:
   a core processor;
   a sub-system in signal communication with the core processor;
   a power supply comprising a first output in power communication with the core processor;
   a power switch in signal communication with the power supply, the power switch for controlling a state of the first output;
   a service processor in signal communication with the sub-system and the power supply, wherein the power supply further comprises a second output, the service processor in power communication with the second output, the second output providing continuous power to the service processor even when the system is powered down;

wherein the service processor is responsive to an unexpected operating condition for detecting a fault of at least one of the sub-system and the power supply and generating a signal representative of the fault, the service processor using a reduced power mode for detecting the fault of the second output;

a light emitting diode display in signal communication with the service processor, the light emitting diode display responsive to the signal to display an indication of the fault;

a back up power supply in power connection with the service processor; and a non-volatile memory in signal communication with the service processor for storing information related to the fault, the non-volatile memory capable of retaining the stored information in the absence of power;

wherein in response to activation of the power switch and a fault of the second output, the service processor uses the back up power supply and the reduced power mode to detect the fault of the second output and generate a signal representative thereof, the signal providing an indication that both the first output and the secondary output have faulted.

2. The system of claim 1, further comprising:

a diode circuit in power connection with the service processor, the diode circuit comprising a first diode in power connection with the continuous output and a second diode in power connection with the back up power supply.

3. The system of claim 1, wherein:

the service processor comprises a first input and a second input, the first input receptive of a voltage of the second output and the second input receptive of a voltage of the back up power supply.

4. The system of claim 1, further comprising:

a clock source in signal communication with the service processor, the clock source capable of generating a high frequency and a low frequency;

wherein the service processor uses the low frequency in conjunction with the reduced power mode for detecting the fault of the second output.

5. The system of claim 1, wherein the back up power source is a coin cell battery.

6. A method of detecting a fault of a power supply for a computer system, the method comprising:

in response to activation of a power switch, making available to a service processor power from a back up power supply;

comparing a voltage of a continuous power output of the power supply to a voltage of the back up power supply;

in response to the voltage of the back up power supply being greater than the voltage of the continuous power output:

selecting a reduced power mode of the service processor;

obtaining power from the back up power supply;

detecting a fault of the power supply;

generating a signal representative of the detected fault of the power supply;

displaying via a LED display receptive of the generated signal an indication of the detected fault;

writing to a non-volatile memory information related to the fault; and generating a signal, the signal providing an indication that both a first output of the power supply and the secondary output of the power supply have faulted.

* * * * *